Figure 1:
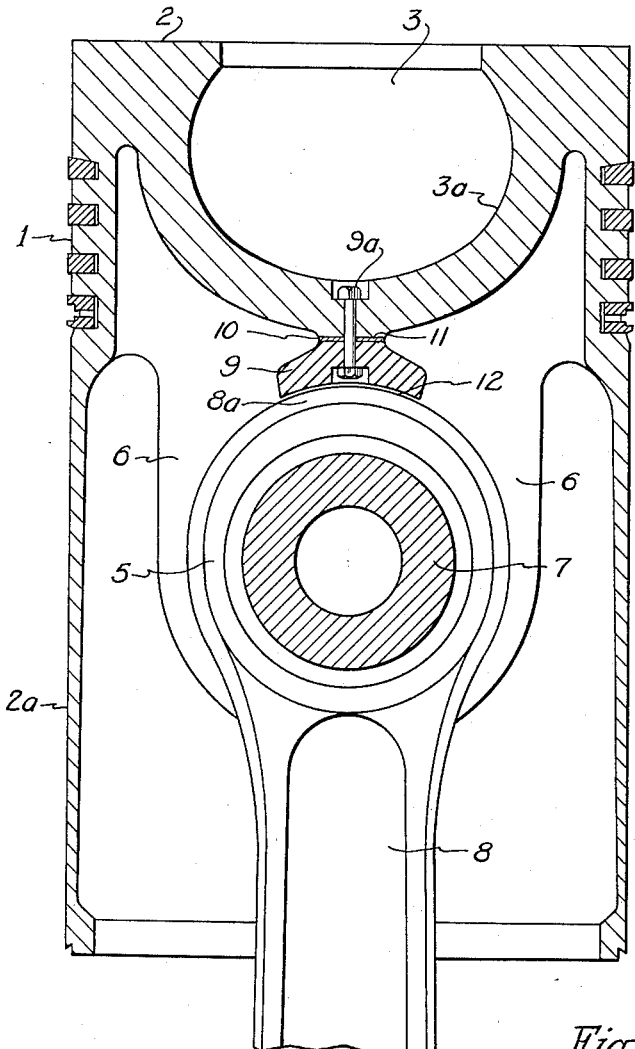

March 27, 1962 — S. MEURER — 3,027,207

PISTON

Filed Aug. 1, 1960

INVENTOR
*Siegfried Meurer*

BY
*Bailey, Stephens & Huettig*
ATTORNEYS

United States Patent Office 3,027,207
Patented Mar. 27, 1962

3,027,207
PISTON
Siegfried Meurer, Nurnberg, Germany, assignor to Maschinenfabrik Augsburg-Nurnberg, A.G., Nurnberg, Germany
Filed Aug. 1, 1960, Ser. No. 46,660
Claims priority, application Germany Aug. 7, 1959
6 Claims. (Cl. 309—19)

This invention relates to a piston and, in particular, to a piston for internal combustion engines, such as high-speed diesel engines.

In these types of engines, the weight of the entire piston structure and especially the weight of the piston head substantially determines how large the inertia forces are and from these the bearing stresses produced during the running of the engine. The piston design for four-cycle internal combustion engines is made in such a way that the gas pressure forces acting on the piston head are transferred to the skirt of the piston. The wrist or piston pin bosses are formed on the skirt and are pressed by ribs against the piston head and the skirt. Pressure forces are therefore transferred from the piston head to the skirt, and from there to the piston pin bosses, and finally to the connecting rod through the piston pin. All cross-sectional areas along this force path must be appropriately proportioned with respect to size in order to avoid the overstressing of any particular portion.

Different piston designs are used in two-cycle engines because the inertia and gas pressure forces here are always applied in but one direction, that is in the direction of the crank shaft assembly. In these engines, the connecting rod is joined to the piston head by means of a ball and socket joint so that the forces on the piston head are transferred directly to the connecting rod. So-called trussed or strut pistons are also known in which the piston pin is not mounted in piston pin holes formed in the piston skirt. Here the piston pin forms only one part of a seat fastened to the connecting rod in the interior of the piston. The piston, together with its center section, is then supported upon this seat. In the last two described piston designs, the force path no longer travels through the central cross-sectional area of the piston but rather through the center portion of the piston.

Piston constructions exist in which the piston head is supported directly on the piston pin by an intermediate member. In these constructions, it is necessary to cut open the head of the connecting rod so that the supporting member can extend into the head of the connecting rod from the piston head. This cutting of the connecting rod decreases the surface area of the connecting rod bearing upon which a high degree of stress already exists, and hence this reduces the strength of the connecting rod with respect to the inertia forces applied thereto.

The object of this invention is to produce a simple construction by means of which the gas pressure and inertia forces are transmitted simultaneously through the piston head to the piston skirt as well as through the center point of the piston head.

As compared to heretofore known piston designs in which the piston pin head is to absorb all of the applied forces, in this invention a considerable portion of the forces, and in particular the forces occurring during the moment of the greatest applied gas pressure to the piston head, are transmitted through a slide bearing block to the connecting rod. Such transfer of forces occurs immediately whenever a predetermined gas pressure force has been imposed upon the piston or after such force has been exceeded. Consequently, the piston pin can be made appreciably smaller than heretofore as the piston pin by itself has to withstand only the forces occurring during the acceleration of the piston toward inner dead center, at which time there is no gas pressure. Because of the three supporting areas provided by the invention for the area, it is possible to apportion the forces through a plurality of force paths for which less piston material is needed for the divided forces. By so doing, a lighter, overall piston weight is obtained, including a lighter piston pin, and without loss of reliable operation. In accordance with the structure of this invention, the three areas of support consist of the two bearing areas of the piston pin in the piston pin bosses, as is conventional, and the third, an additional direct bearing of the center portion of the piston head on the top of the connecting rod.

When a hollow wrist pin is used, it is given a cross-sectional wall area such that the maximum permissible deflection of the pin, when loaded, will have taken place at 60% of the highest force applied to the piston head, at which time the forces on the piston head are transmitted only to the piston pin bosses.

Instead of supporting the slide bearing member directly upon the top of the upper or small end of the connecting rod, another feature of the invention lies in forming an air space or gap between the bearing surface of the bearing member and the top of the connecting rod, which space is the same or less than the distance the piston pin deflects at the time that 60% of the maximum force load is applied to the piston head. By this means, the forces applied to the piston head can be divided into individual force paths transmitted through separate cross-sectional areas of the piston head.

Figure 2:
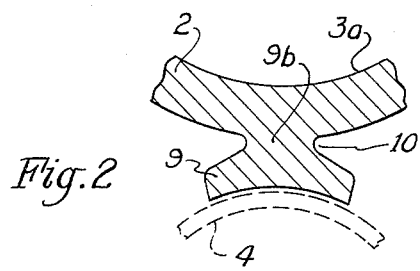

The means by which the objects of the invention are obtained are described more fully with reference to the accompanying drawings, in which:

FIGURE 1 is a longitudinal cross-sectional view through the piston of this invention and a part of its connecting rod; and FIGURE 2 is a cross-sectional view through a modified form of the slide bearing member shown in FIGURE 1.

In FIGURE 1, the piston 1 has a head 2 and a skirt 2a. The piston head 2 contains a combustion chamber 3 in the shape of a body of rotation having a wall 3a. Wrist pin bosses 5, of which only one is shown in FIGURE 1, are secured to piston skirt 2a by ribs 6. The hollow piston pin 7 is journalled in bosses 5. The connecting rod 8 is secured to pin 7.

On the bottom of the piston head is mounted a slide bearing block 9. As shown in FIGURE 1, this bearing block is a separate piece rigidly fastened to the combustion chamber in the piston head by means of a bolt 9a. This block slides on the top 8a of connecting rod 8. The block 9 has a narrowed neck portion 10 where it is connected to the piston head so that less heat is conveyed from the combustion chamber to the bearing member by reason of the reduced area of contact. The heat transfer is further lessened by a layer of insulating material 11, such as asbestos, which is inserted between the narrow neck portion 10 and the piston head. The bearing block can be supported directly upon the head 8a of the connecting rod.

In the modification shown in FIGURE 2, the bearing block 9 is formed integral with the piston head 2 through the medium of a connecting portion 9b, which again is in the form of a narrow neck connecting portion.

In heretofore known pistons, all of the forces acting on piston head 2 as well as upon combustion chamber wall 3a were transferred to the piston pin bosses by way of the ribs 6 and the skirt 2a. As a result, these portions had to be of relatively large cross-sectional area. In this invention, the addition of the bearing block 9 adapted to slide on the top 8a of the connecting rod is for the purpose of transmitting a part of the gas pressure forces applied to the piston head. By so doing, the separate cross-sectional areas upon which strain occurs are now constructed substantially smaller than heretofore so that the overall piston is of less weight.

In FIGURE 1, the space or air gap 12 between the sliding surface of block 9 and the top 8a of the connecting rod is made large enough so that there is sufficient play between the block and connecting rod top during occasions of normal stress. The piston pin made intentionally relatively weak deflects or bends under the gas pressures applied to the piston head and only then does the bearing block 9 contact the top 8a of the connecting rod to be supported thereby. When there is no contact, the space prevents the undesired transfer of heat from the combustion chamber to the connecting rod. When this air gap is used, the parts are so designed that the space or gap is the same or less than the distance the piston pin has been bent or deflected at the time that 60% of the maximum force has been applied against the piston head. The thickness of the wall of piston pin 7 is made such that the piston pin has already been bent to its furthest extent at the time when 60% of the highest piston head force occurs, and before which time, the piston head has been supported solely through the two wrist pin bosses.

Having now described the means by which the objects of the invention are obtained, I claim:

1. A piston for an internal combustion engine comprising a piston head, a skirt attached to said head, and a slide bearing block rigidly secured to the under surface of said piston head and centered on the longitudinal axis of said piston within said skirt, a connecting rod, piston pin means for joining said connecting rod to piston pin bosses and said skirt, said bearing block being slidingly engageable with the top of said connecting rod to partially support said head upon said connecting rod upon the exceeding of a predetermined force applied to said piston head.

2. A piston as in claim 1, said piston pin means comprising a hollow piston pin joined to said piston and having a wall cross-sectional area such that when the piston head is supported solely by the piston pin bosses, said pin has its maximum deflection at 60% of the highest force applied to said piston head.

3. A piston as in claim 2, said bearing block being spaced from contact with said connecting rod a distance which is not greater than the distance said pin deflects at said 60% of the highest force applied to said piston head.

4. A piston as in claim 3, said bearing block further comprising a narrow neck connecting portion joined to said piston head.

5. A piston as in claim 4, further comprising a heat insulating layer between said bearing block and said piston head.

6. A piston as in claim 5, said heat insulating layer being positioned between said narrow neck connecting portion and said piston head.

References Cited in the file of this patent
UNITED STATES PATENTS

| | | |
|---|---|---|
| 1,737,915 | Carrillo | Dec. 3, 1929 |
| 2,442,408 | Graham | June 1, 1948 |